March 28, 1961  S. J. CASSARINO ET AL  2,976,880
VERTICAL EXHAUST PILOT ACTUATED SAFETY VALVE
Filed Feb. 20, 1959
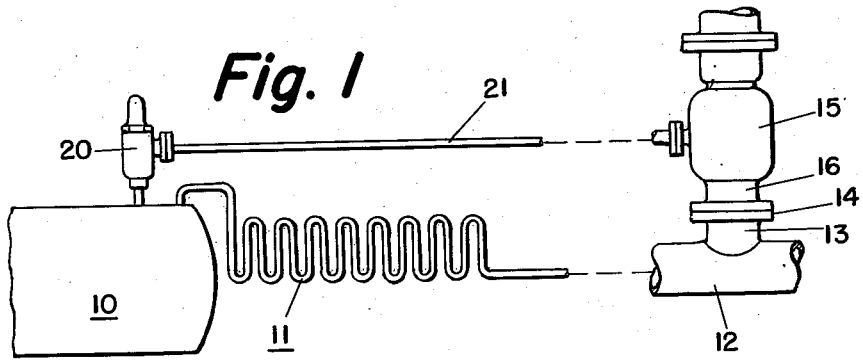
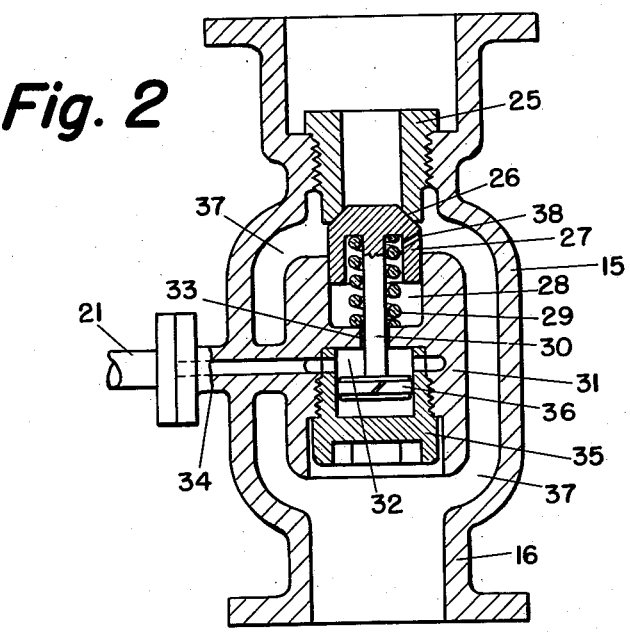
INVENTORS
SEBASTIAN J. CASSARINO
JAMES L. MERSHON
BY
ATTORNEY

United States Patent Office 2,976,880
Patented Mar. 28, 1961

2,976,880

VERTICAL EXHAUST PILOT ACTUATED SAFETY VALVE

Sebastian J. Cassarino, 9504 Wadsworth Drive, Bethesda, Md., and James L. Mershon, 5912 Grayson St., Springfield, Va.

Filed Feb. 20, 1959, Ser. No. 794,779

1 Claim. (Cl. 137—219)

(Granted under Title 35, U.S. Code (1952), sec. 266)

This invention relates to fluid pressure systems and in particular is concerned with valve construction for use in valve control for such pressure systems.

A broad object of the invention is to provide a valve construction which controls fluid flow in such manner as to prevent or reduce thermal or mechanical stresses in pressure systems.

Another object is to provide a valve for fluid pressure systems which permits symmetrical or generally straight line flow through the valve body or housing.

Another object is to assemble the valve elements within a valve or body in a manner to align the valve exhaust with that of the valve inlet.

A more specific object is to provide a valve construction whereby the valve opens to exhaust upon increase of pressure in the valve body.

Other objects and various further features of the invention will hereinafter be pointed out or will occur to those skilled in the art from a reading of the following specification in conjunction with the accompanying drawings, Fig. 1 is a diagrammatic representation of a valve control system for superheated steam.

Fig. 2 is a vertical sectional view of a valve used in the control system of Fig. 1 and showing details of the construction.

In Fig. 1, steam under pressure from a boiler, superheater, or other pressure vessel 10 is directed through a heat exchanger 11 to a conduit 12 from which it passes to other equipment (not shown) for use as desired. A branch line 13 extends upwardly from conduit 12 and is flanged at 14 to receive a main or superheater valve 15. Steam enters the main or superheater valve 15 through a flanged inlet 16 to which branch line 13 is secured and remains within the body of the valve 15 until it opens at a predetermined pressure for which it is set to exhaust.

In order to open the main or superheater valve 15, a pilot valve 20 is incorporated in the system and is in communication with the pressure vessel 10. The pilot valve 20 is connected to the main or superheater valve 15 through a steam line 21 and functions to open valve 15 to cause it to exhaust when a predetermined pressure exists in the vessel 10 and other equipment of the pressure system. Detailed explanation of pilot valve 20 is unnecessary since it is only mentioned as an element of the control valve assembly for a pressure system and functions to operate the main or superheater valve 15 at a predetermined pressure setting of the pilot valve.

In the usual control valve assembly for pressure systems such as that described in Fig. 1, the steam exhausts from valve 15 generally at right angles to the inlet passageway of the valve. For example, the steam from conduit 12 would enter the inlet 16 of the superheater valve 15 in a vertical direction and after passing through the valve body would exhaust or be directed outwardly and laterally of the valve body.

The valve assembly of the present invention, as shown in Fig. 2 positionally locates the various valve elements so that the steam continues through the valve body in a vertical direction and is exhausted at the upper end of the valve.

In Fig. 2 details of the valve 15 of the present invention are shown and are arranged for the steam which enters the valve body or housing through the valve inlet 16 to pass therethrough in a symmetrical path or straight line to the exhaust opening through a removable ring or tubular insert 25 to thereby reduce or eliminate unbalanced temperature gradations during its passage through the valve body or to reduce bending moments which would occur if the steam were to be exhausted laterally from the side of the valve or at an angle to the direction of the incoming steam. To this end, a valve seat 26 is provided at the inner or lower end of the insert 25 and a cooperating valve plug 27 is disposed within a chamber 28 and arranged for reciprocating movement therein toward and away from the seat 26. The valve plug 27 is maintained normally closed, as shown, by a compressible spring 29 which is disposed about a vertical guide 30 which depends from the inner face of valve plug 27.

The chamber 28 comprises the upper portion of a partitioned cylinder or H-shaped member 31 which is formed or disposed within the valve body and the housing 31 also provides a lower chamber 32 which communicates with the upper chamber through passageway 33. Chamber 32 communicates through the valve body and with the steam line 21 by means of a flanged lateral connection 34. A removable plug insert 35 screw-threadedly engages the wall of lower chamber 32 and the lower end of vertical guide 30 receives a disc 36 which is disposed within chamber 32 below the inlet end of lateral connection 34. A plurality of vertical passageways 37 are formed in the valve body and are arranged to communicate with the conduit 12 through valve inlet 16. Consequently, steam entering the inlet 16 of the valve body is directed upwardly to enter chamber 28 through seepage between the valve plug 27 and housing 31 or through apertures 38 provided in the valve plug for this purpose.

In operation of the superheater valve 15 the several elements enclosed therein will be in the position shown in Fig. 2 since steam entering the inlet 16 from conduit 12 will be at the same pressure within the passageways 37, chamber 28 and line 21 and the valve will be closed. On opening of pilot valve 20 steam will pass into chamber 32 through line 21, increasing the pressure on disc 36 and overcome spring 29, which normally holds the valve plug 27 closed, and the valve plug will be unseated, exiting steam through the exhaust 25.

The invention described herein may be manufactured and used by or for the Government of the United States of America for governmental purposes without the payment of any royalties thereon or therefor.

What is claimed is:

A relief valve comprising a valve body having an inlet end portion for connection to a main fluid conduit and an exhaust end portion aligned with the inlet end portion and providing a central chamber therewith, a tubular insert having one end secured in said exhaust end portion and extending longitudinally inward to provide an open end within the central chamber forming a valve seat, a cylinder disposed within and spaced from the walls of the central chamber providing for the passage of fluid thereabout and longitudinally through the valve body from the main fluid conduit, a centrally apertured transverse partition in said cylinder providing a first cup-shaped housing having an open end facing said valve seat and a second cup-shaped housing having an open end facing the inlet end portion of the valve body, a longitudinally movable guide shaft extending through the aperture in said transverse partition and having one end disposed in said first cup-shaped housing and its other end disposed in said second cup-shaped housing, a first hollow plug secured to said one end of the shaft having an open end extending into said first cup-shaped housing in telescoping and movable relation therewith and a closed end for cooperating with said valve seat, a second hollow plug secured in the second cup-shaped housing and having a closed end providing a pressure compartment, a piston mounted at the other end of the guide shaft and disposed in said pressure compartment, coil spring means about said one end of the shaft and normally in compression for urging the closed end of said first hollow plug in seated relation with said valve seat and an auxiliary fluid conduit in communication with said pressure compartment and extending to a point exteriorly of the valve body and being operative to increase pressure in said compartment to overcome the spring resistance for unseating the valve plug and permitting fluid to exhaust from the valve body.

References Cited in the file of this patent

UNITED STATES PATENTS

| | | |
|---|---|---|
| 2,085,893 | Boland | July 6, 1937 |
| 2,868,220 | Freeman | Jan. 13, 1959 |